(12) United States Patent
Sargisian

(10) Patent No.: US 7,028,850 B1
(45) Date of Patent: Apr. 18, 2006

(54) ADJUSTABLE MOTORCYCLE SUPPORT STAND

(76) Inventor: Aram Sargisian, 2012 W. Ash St., Apt. K-19, Columbia, MO (US) 65203

( * ) Notice: Subject to any disclaimer, the term of this patent is extended or adjusted under 35 U.S.C. 154(b) by 205 days.

(21) Appl. No.: 10/748,002

(22) Filed: Dec. 30, 2003

(51) Int. Cl.
*B66F 3/08* (2006.01)
(52) U.S. Cl. .............................. 211/22; 211/17; 211/21; 211/24; 254/85
(58) Field of Classification Search .................. 211/22, 211/17, 5, 19, 20, 21, 23, 24, 85.8, 168; 180/9.25; 224/413; 254/46, 85, 98, 100; D12/107, D12/110, 114, 115; 248/612, 674, 207, 214, 248/215
See application file for complete search history.

(56) References Cited

U.S. PATENT DOCUMENTS

| 453,094 | A | | 5/1891 | Taylor | |
|---|---|---|---|---|---|
| 1,113,015 | A | | 10/1914 | Jones | |
| 1,131,018 | A | * | 3/1915 | Troutman | ..................... 254/85 |
| 3,303,936 | A | * | 2/1967 | Barnawell | ................... 211/134 |
| D226,808 | S | * | 5/1973 | Rollins | ....................... D12/162 |
| 4,183,511 | A | * | 1/1980 | Marek | ......................... 269/17 |
| 4,580,804 | A | | 4/1986 | Weber | |
| 4,659,044 | A | * | 4/1987 | Armstrong | ............... 248/218.4 |
| 4,674,744 | A | * | 6/1987 | Walsh | ......................... 473/430 |
| 4,745,791 | A | * | 5/1988 | Fish | ............................. 72/305 |
| D337,042 | S | * | 7/1993 | Lin et al. | ..................... D8/349 |
| 5,639,067 | A | | 6/1997 | Johnson | |
| D387,970 | S | * | 12/1997 | Enslen | ........................ D8/349 |
| 5,816,561 | A | | 10/1998 | Kinsel | |
| 5,979,878 | A | | 11/1999 | Blankenship | |
| 6,073,915 | A | | 6/2000 | Taylor | |
| 6,196,567 | B1 | | 3/2001 | Lynam | |
| 6,267,316 | B1 | * | 7/2001 | Cross | ..................... 242/422.5 |
| 6,464,207 | B1 | | 10/2002 | Creel | |
| 6,581,784 | B1 | | 6/2003 | Pino | |

* cited by examiner

*Primary Examiner*—Richard E. Chilcot, Jr.
*Assistant Examiner*—Jared W. Newton
(74) *Attorney, Agent, or Firm*—Randal D. Humburg

(57) ABSTRACT

The motorcycle support stand is a compact and folding device used as an additional support to a motorcycle when parking the motorcycle in a location where firm ground is not available, specifically a muddy field or a location having unstable or uneven ground conditions not conducive to the motorcycle being supported by its own kick stand. The device, comprising a base support frame and an adjustable height pedestal with a frame engaging trough, is compact and storable, being presented in several component parts without requiring any tools, and may be adjusted to the height of any motorcycle, being adapted to any motorcycle.

2 Claims, 4 Drawing Sheets

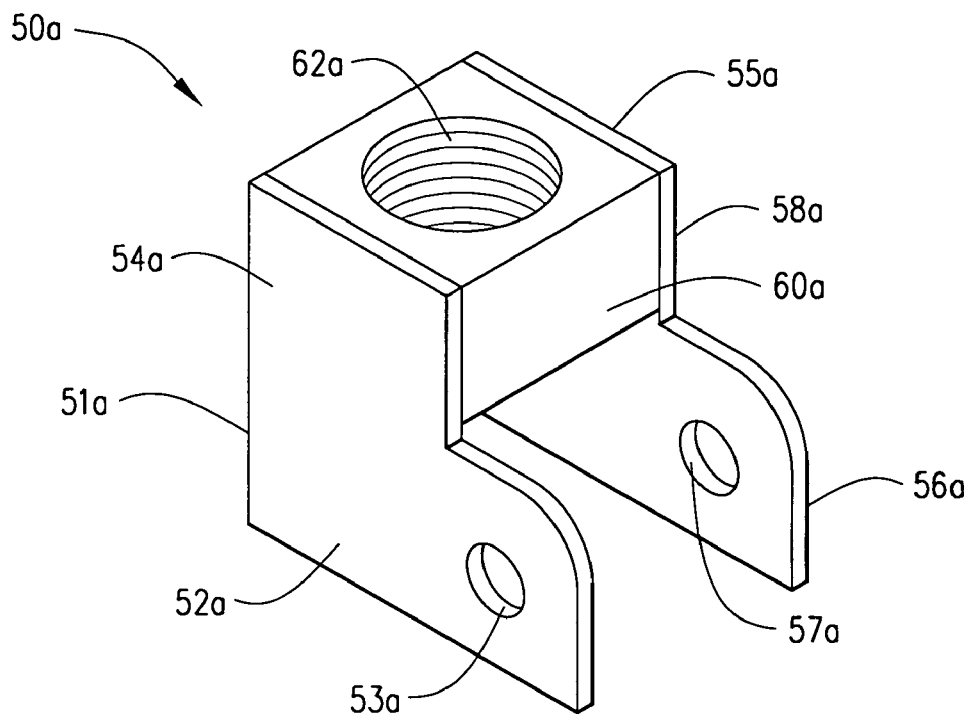
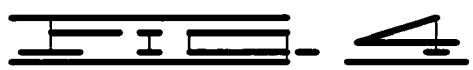
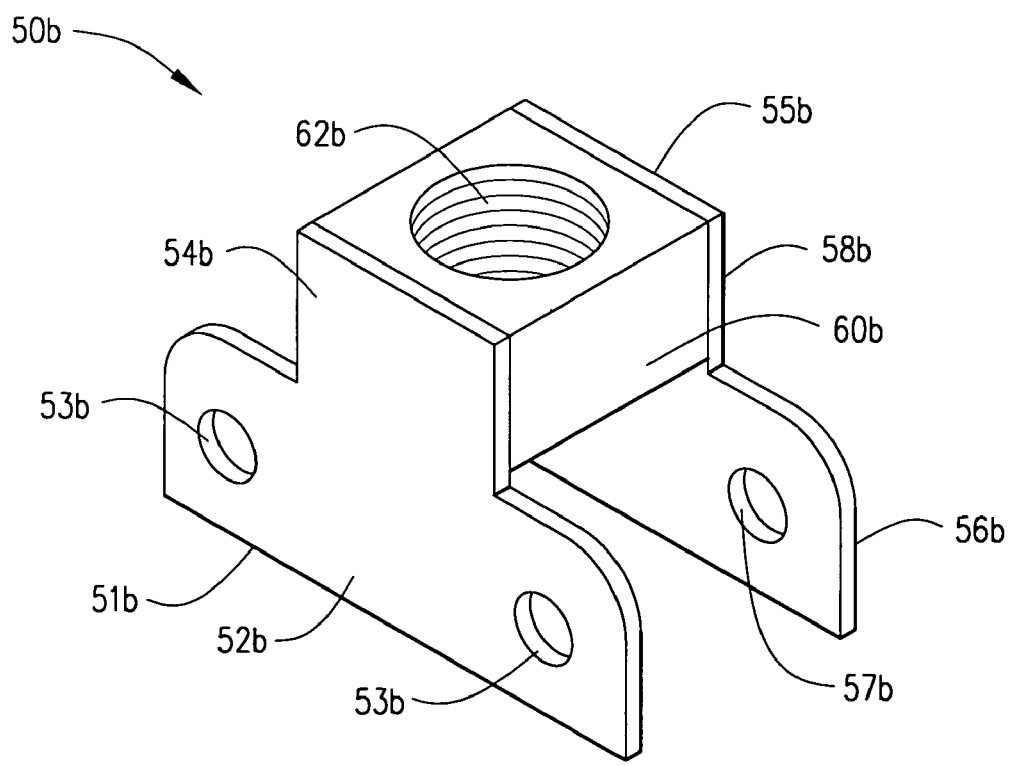

ADJUSTABLE MOTORCYCLE SUPPORT STAND

CROSS REFERENCE TO RELATED APPLICATIONS

None

I. BACKGROUND OF THE INVENTION

1. Field of Invention

The motorcycle support stand is a compact and folding device used as an additional support to a motorcycle when parking the motorcycle in a location where firm ground is not available, specifically a muddy field or a location having unstable or uneven ground conditions not conducive to the motorcycle being supported by its own kick stand. The device, comprising a base support frame and an adjustable height pedestal with a frame engaging trough, is compact and storable, being presented in several component parts without requiring any tools, and may be adjusted to the height of any motorcycle, being adapted to any motorcycle.

2. Description of Prior Art

The following U.S. patents were discovered and are disclosed within this application for utility patent. All relate to motorcycle jacks and jack stands.

Several prior art patents involve devices which are intended to elevate the motorcycle for maintenance and repair and are considered motorcycle jacks or jack stands. Those involve not only support stands, but also lifting means, which literally jack the motorcycle frame up off the ground. In U.S. Pat. No. 6,581,784 to Pino, a lever-type jack is disclosed which has a rigid connecting rod and a motorcycle support rod connected between side plates and has a lever handle, the device inserted under a motorcycle with the connecting rod and support rods both on the ground surface, the motorcycle rod being elevated and the lever handle is rotated, the motorcycle frame being lifted as the motorcycle rod becomes vertically oriented over the support rod. Two U.S. Pat. No. 6,464,207 to Creel and U.S. Pat. No. 5,979,878 to Blankenship involve lifting devices that have parallel support arms that lift the motorcycle above the devices as the parallel arms with an upper support plate are moved into a vertical orientation by a lever arm (Creel) or a contact plate attached to cables connected to the parallel arms (Blankenship). A pivotal rotating support surface placed under a motorcycle frame and raised using a wrench, the support stand having feet which may be adjusted to height. U.S. Pat. No. 4,580,804 to Weber is a pair of legs which are pivotally attached to a motorcycle frame that may be dropped down from the frame for a two leg support and retracted back into a horizontal stored position against the motorcycle frame using a spring retracting means. The legs appear to have some adjustment ability for length using a locking telescopic means.

U.S. Pat. No. 6,073,915 to Taylor is an A-frame jack which elevates as the two A-frame legs are moved closer together, with the fulcrum between the two legs being attached to a motorcycle frame, the legs being urged together and apart by a turnbuckle between the two legs, although not clearly shown in that patent. In U.S. Pat. No. 5,816,561 to Kinsel, a compact and portable motorcycle jack stored in a tow sack, is assembled with two threaded post members engaging a cross bar assembly, the cross bar being raised on the threaded post members by the turning of actuating nuts below the cross bar assembly.

U.S. Pat. No. 6,196,567 to Lyman is a fanned attachment to be attached to the bottom of a motorcycle kick stand to increase the contact surface of the kick stand end to prevent sinking into soft surfaces, addressing the similar problem of the current invention. U.S. Pat. No. 453,094 to Taylor is submitted to indicate the early versions of a kick stand applied to two wheeled vehicles.

II. SUMMARY OF THE INVENTION

Some of the time, a motorcycle enthusiast will travel to certain locations that do not provide paved parking access. This leaves the motorcyclist with limited parking options, having to either find suitable locations to park where there are firm and solid ground conditions to provide a sturdy surface for the motorcycle kick stand, or risk having the motorcycle fall over on its side. A quickly assembled solid support stand for a motorcycle, having a vertically adjusting means and a large surface contact area base would be useful in providing a secondary support to a motorcycle to stabilize and support the motorcycle in an upright position on soft or uneven ground surface which may be assembled without the need for tools.

It is therefore the primary objective of the motorcycle support stand to provide a secondary motorcycle support stand which may be placed underneath a motorcycle and engage the motorcycle frame to support the motorcycle on soft and uneven ground surfaces. A secondary objective of the motorcycle support stand to provide such stand in such a way as to avoid the need for tools to assemble the components of the stand. A third objective is to provide the motorcycle support stand in assembled components that is compact and storable to be carried on a motorcycle without the need for a great deal of storage space, the component parts being sized to fit in a small carrying bag or container.

III. DESCRIPTION OF THE DRAWINGS

The following drawings are submitted with this utility patent application.

FIG. 4 is a perspective view of a first embodiment of the pedestal mounting bracket.

FIG. 5 is a perspective view of a second embodiment of the pedestal mounting bracket.

IV. DESCRIPTION OF THE PREFERRED EMBODIMENT

Figure 1:
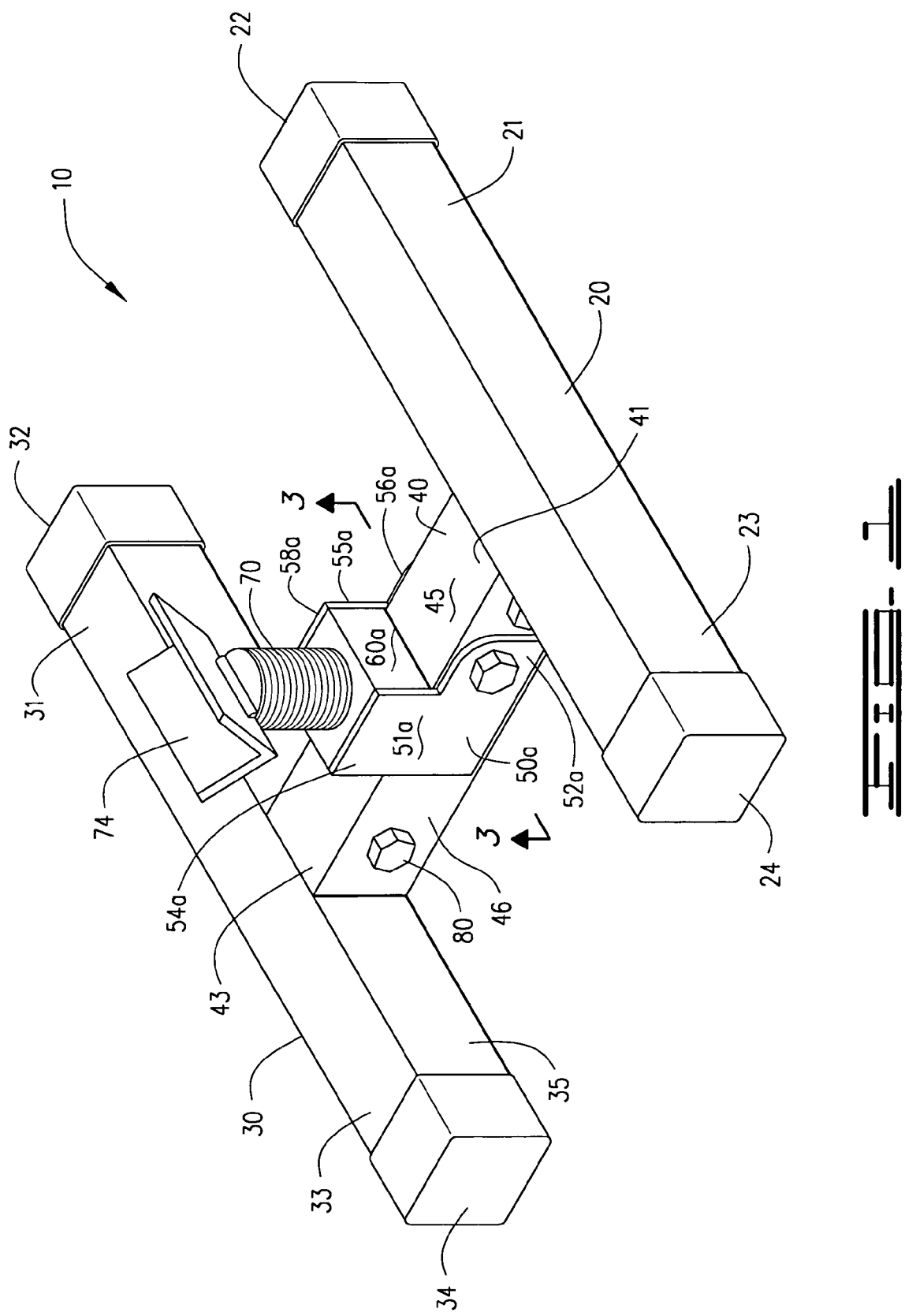
FIG. 1 is a perspective view of the motorcycle support stand.

A motorcycle support stand 10 providing secondary support to a motorcycle having a frame when parked on soft or uneven ground surfaces, shown in FIGS. 1–5 of the drawings, the motorcycle support stand 10 comprising a first support member 20 having an inner surface 25 with an inner attachment extension 27, a second support member 30 having an inner surface 35 with an inner attachment extension 37, a cross support member 40 removably connecting the inner attachment extension 27 of the first support member 20 and the inner attachment extension 37 of the second support member 30, the cross support member 40 having an upper surface 45 containing an upper receiver aperture 47, a mounting bracket 50a, 50b removably attached to the cross support member 40, the mounting bracket 50a, 50b having a pedestal mounting block 60a, 60b with an inner threaded bore 62a, 62b oriented over the upper receiver aperture 47 of the cross support member 40, the inner threaded bore 62a, 62b engaging an outer threaded neck 71 of a pedestal 70, the pedestal 70 having an upper end 72 attached to a V-shaped support channel 74 for placement under the motorcycle frame, wherein the first support member 20, second support member 30 and cross support member 40 are connected in an H-shape which is placed on the ground surface, with the outer threaded neck 71 of the pedestal 70 being inserted into the inner threaded bore 62a, 62b of the pedestal mounting block 60a, 60b attached to the mounting bracket 50a, 50b connected to the cross support member 40 providing an adjustable height support for the motorcycle when the V-shaped support channel 74 is abutted against the motorcycle frame, the pedestal 70 being raised or lowered to the height of the motorcycle frame when parked.

Figure 2:
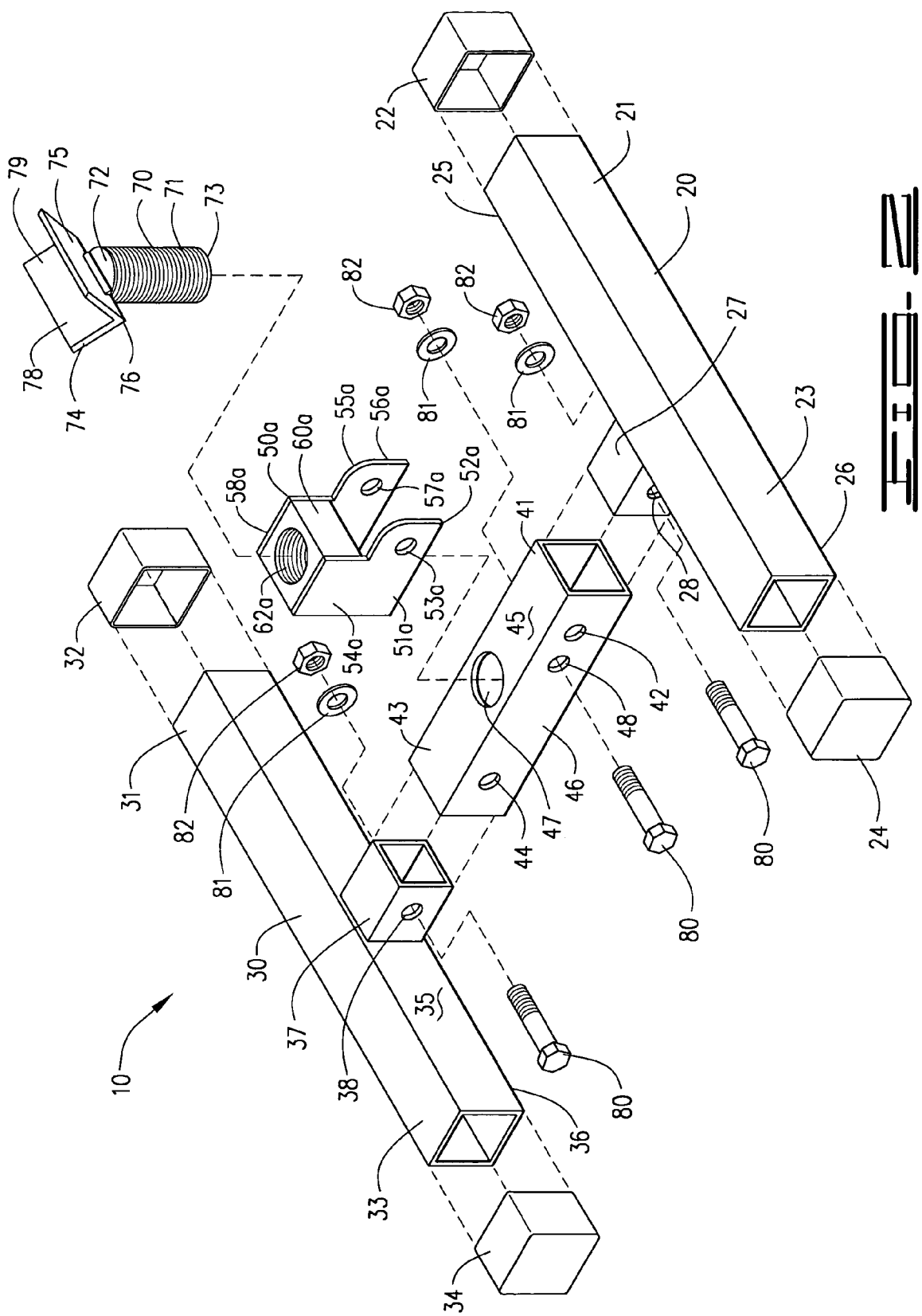
FIG. 2 is an exploded perspective view of the motorcycle support stand.

The first support member 20, FIGS. 1–2, is further defined as having an end cap 22 on a first end 21 and an end cap 24 on a second end 23 to prevent weathering of the respective ends 21, 23 of the first support member 20. Likewise, the second support member 30, FIGS. 1–2, is also further defined as having an end cap 32 on a first end 31 and an end cap 34 on a second end 33. The first support member 20 also includes a lower surface 26 and the second support member 30 has a lower surface 36. The inner attachment extension 27 of the first support member 20 has aligned bolt holes 28 and the inner attachment extension 37 of the second support member 30 has aligned bolt holes 38.

The cross support member 40 has a first end 41 having first bolt holes 42 and a second end 43 having second bolt holes 44. The cross support member 40 has a diameter larger than a diameter of the inner attachment extensions 27, 37 of the first support member 20 and second support member 30 allowing the inner attachment extensions 27, 37 to slide within the first end 41 and second end 43 of the cross support member 40, wherein the bolt holes 28 on the inner attachment extension 27 of the first support member 20 are aligned with the bolt holes 42 of the first end 41 of the cross support member 40, and the bolt holes 38 on the inner attachment extension 37 of the second support member 30 are aligned with the bolt holes 44 of the second end 43 of the cross support member 40, with a bolt 80, secured by a washer 81 and a nut 82, placed through the aligned and respective bolt holes 28, 42 and 38, 44, as indicated in FIG. 2 of the drawings.

Figure 3:
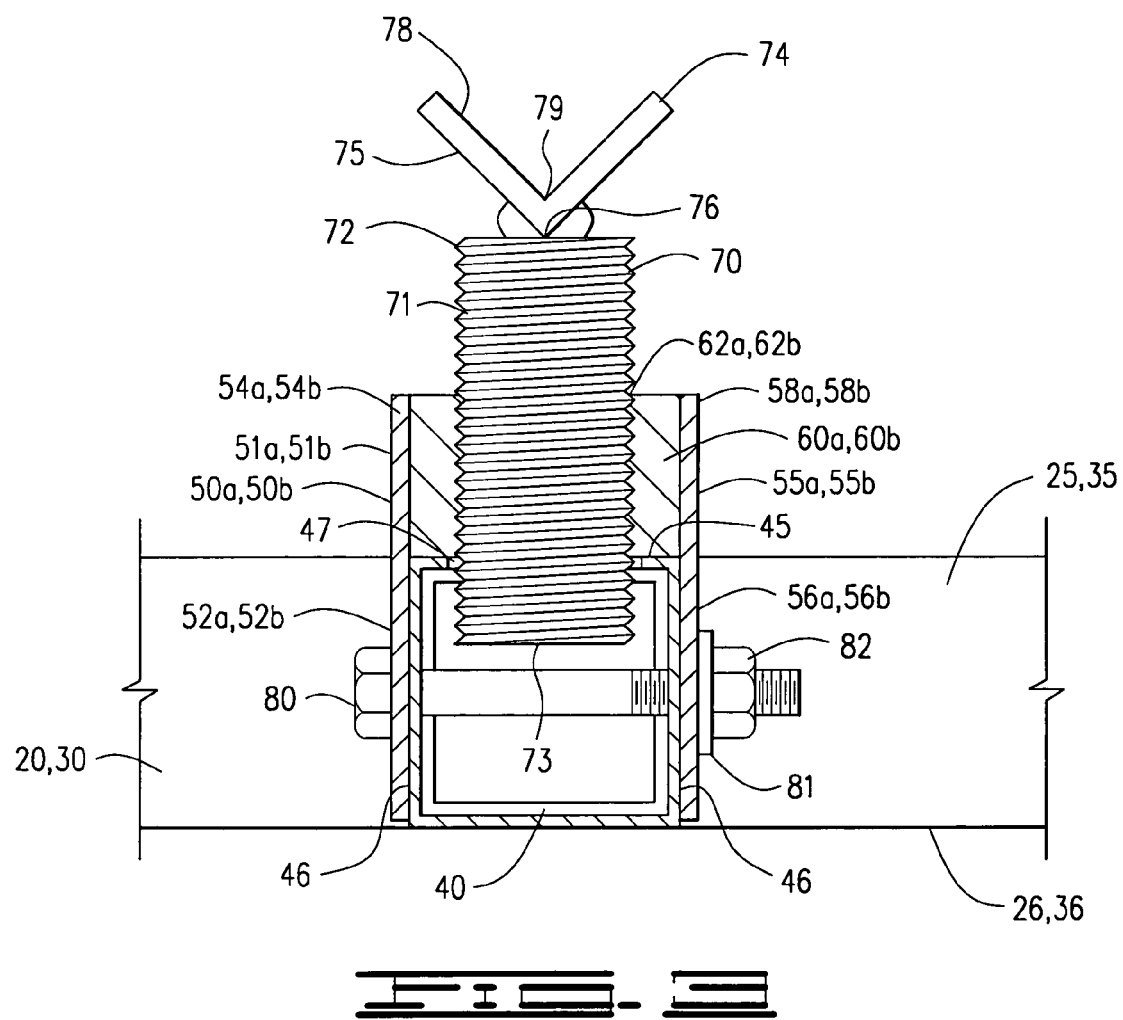
FIG. 3 is a side cross sectional view of the motorcycle support stand with isolation of the central support member, the pedestal mounting bracket, the threaded pedestal with the V-shaped support plate, along section lines 3/3 of FIG. 1.

The pedestal 70 is again defined as having the outer threaded neck 71 which is intended to engage the inner threaded bore 62a, 62b of the pedestal mounting block 60a, 60b which is connected between the first side plate 51a, 51b and second side plate 55a, 55b of the mounting bracket 50a, 50b. As further shown in FIG. 3, the pedestal 70 includes the upper end 72 and a lower end 73, the lower end 73 inserted within the inner threaded bore 62a, 62b of the pedestal mounting block 60a, 60b. The V-shaped support channel 74 is further defined as having an outer surface 75 with a lower angled edge 76 which is welded to the upper end 72 of the pedestal 70. The support channel 74 also has an inner surface 78 defining a trough 79, the trough 79 being the portion of the support channel 74 which engages the motorcycle frame. The pedestal 70 is rotated within the inner threaded bore 62a, 62b to extend or lower the pedestal 70, with the upper received aperture 47 allowing for protrusion of the lower end 73 of the pedestal 70 into the cross support member 40, if necessary, for a low height adjustment, as seen in FIG. 3.

The mounting bracket 50a, 50b is provided in two embodiments. In a first embodiment 50a, shown in FIG. 4, the mounting bracket has a first side plate 51a and a second side plate 55a which are L-shaped, the first side plate 51a and second side plate 55a having lower arms 52a, 56a with bracket mounting holes 53a, 57a and upper arms 54a, 58a. The upper arms 54a, 58a of the first side plate 51a and second side plate 55a attach to the pedestal mounting block 60a, leaving space between the lower arms 52a, 56a. The lower arms 52a, 56a are adapted to straddle the cross support member 40, with the inner threaded bore 62a of the pedestal mounting block 60a oriented directly over the upper receiver aperture 47 of the cross support member 40. Another bolt 80, is inserted through the aligned bracket mounting holes 53a, 57a of the lower arms 52a, 56a of the first side plate 51a and second side plate 55a, the same bolt 80 passing through at least one set of aligned mounting bracket bolt holes 48 of the cross support member 40, as shown in FIGS. 1–3. A nut 82 and washer 81 are applied to the bolt 80 to secure the bolt 80 after insertion. This first embodiment mounting bracket 50a may attach pivotally to the cross support member 40 if a single bolt 80 is used to connect the mounting bracket 50a to the cross support member 40.

In a second embodiment, the mounting bracket 50b, shown in FIG. 5, has a first side bracket 51b and second side bracket 55b that are T-shaped, the first side plate 51b and second side plate 55b having lower arms 52b, 56b with bracket mounting holes 53b, 57b and upper arms 54b, 58b. The upper arms 54b, 58b of the first side plate 51b and second side plate 55b attach to the pedestal mounting block 60b, leaving space between the lower arms 52b, 56b. The lower arms 52b, 56b are adapted to straddle the cross support member 40, with the inner threaded bore 62b of the pedestal mounting block 60b oriented directly over the upper receiver aperture 47 of the cross support member 40. The lower arms 52b, 56b have at least two sets of aligned bracket mounting holes 53b, 57b through the first side plate 51b and second side plate 55b with a bolt 80 passing through at least two sets of aligned mounting bracket holes 48 in the cross support member 40 (not indicated in the drawings). Nuts 82 and washers 81 secure the bolts 80 after insertion. This second embodiment of the mounting bracket 50b would not be pivotally attached to the cross support member 40.

While the invention has been particularly shown and described with reference to a preferred embodiment thereof, it will be understood by those skilled in the art that changes in form and detail may be made therein without departing from the spirit and scope of the invention.

What is claimed is:

1. A motorcycle support stand providing secondary support to a motorcycle having a frame when parked on soft or uneven ground surfaces, said motorcycle support stand comprising:

a first support member having an inner surface with an inner attachment extension, an end cap on a first end, an end cap on a second end and a lower surface, a second support member having an inner surface with an inner attachment extension, an end cap on a first end, an end cap on a second end and a lower surface;

said inner attachment extension of said first support member having aligned bolt holes and said inner attachment extension of said second support member having aligned bolt holes;

a cross support member removably connecting said inner attachment extension of said first support member and said inner attachment extension of said second support member, said cross support member defining an upper surface containing an upper receiver aperture, said cross support member further defining a first end having first bolt holes and a second end having second bolt holes, said cross support member presenting a perimeter larger than a perimeter of said inner attachment extensions of said first support member and second support member, wherein said inner attachment extensions slide within said first end and second end of said cross support member, said bolt holes on said inner attachment extension of said first support member aligned with said bolt holes of said first end of said cross support member, and said bolt holes on said inner attachment extension of said second support member aligned with said bolt holes of said second end of said cross support member, with a bolt, secured by a washer and a nut, placed through said aligned and respective bolt holes;

a mounting bracket removably attached to said cross support member said mounting bracket having a pedestal mounting block with an inner threaded bore oriented over said receiver aperture of said cross support member, said mounting bracket further comprising an L-shaped first side plate and an L-shaped second side plate, said first side plate and said second side plate having upper arms and lower arms with bracket mounting holes, said upper arms of said first side plate and second side plate attaching to said pedestal mounting block, said lower arms adapted to straddle said cross support member, with said inner threaded bore of said pedestal mounting block positioned directly over said upper receiver aperture of said cross support member, wherein a bolt is inserted through said aligned bracket mounting holes of said lower arms of said first side plate and second side plate, said bolt passing through at least one set of aligned mounting bracket bolt holes of said cross support member, with a nut and washer applied to said bolt to secure said bolt after insertion a pedestal presenting an outer threaded neck adapted to threadably engage said inner threaded bore of said pedestal mounting block, connected between a first side plate and a second side plate of said mounting bracket, said pedestal further defining an upper end and a lower end, said lower end inserted within said inner threaded bore of said pedestal mounting block; and a V-shaped support channel having an outer surface forming a lower angled edge welded to said upper end of said pedestal, said support channel also having an inner surface defining a trough, said trough adapted to engage said motorcycle frame, wherein said pedestal is rotated within said inner threaded bore extending or lowering said pedestal, with said upper receiver aperture allowing for protrusion of said lower end of said pedestal into said cross support member.

2. A motorcycle support stand providing secondary support to a motorcycle having a frame when parked on soft or uneven ground surfaces, said motorcycle support stand comprising:

a first support member having an inner surface with an inner attachment extension, an end cap on a first end, an end cap on a second end and a lower surface, a second support member having an inner surface with an inner attachment extension, an end cap on a first end, an end cap on a second end and a lower surface;

said inner attachment extension of said first support member having aligned bolt holes and said inner attachment extension of said second support member having aligned bolt holes;

a cross support member removably connecting said inner attachment extension of said first support member and said inner attachment extension of said second support member, said cross support member defining an upper surface containing an upper receiver aperture, said cross support member further defining a first end having first bolt holes and a second end having second bolt holes, said cross support member presenting a perimeter larger than a perimeter of said inner attachment extensions of said first support member and second support member, wherein said inner attachment extensions slide within said first end and second end of said cross support member, said bolt holes on said inner attachment extension of said first support member aligned with said bolt holes of said first end of said cross support member, and said bolt holes on said inner attachment extension of said second support member aligned with said bolt holes of said second end of said cross support member, with a bolt, secured by a washer and a nut, placed through said aligned and respective bolt holes;

a mounting bracket removably attached to said cross support member, said mounting bracket having a pedestal mounting block with an inner threaded bore oriented over said receiver aperture of said cross support member said mounting bracket further comprising a T-shaped first side bracket and a T-shaped second side bracket, said first side plate and said second side plate having upper arms and lower arms with bracket mounting holes, said upper arms of said first side plate and second side plate attaching to said pedestal mounting block, said lower arms adapted to straddle said cross support member, with said inner threaded bore of said pedestal mounting block positioned directly over said upper receiver aperture of said cross support member, said lower arms having at least two sets of aligned bracket mounting holes through said first side plate and second side plate with a bolt passing through aligned mounting bracket holes in said cross support member, a nut and a washer securing said bolts after insertion a pedestal presenting an outer threaded neck adapted to threadably engage said inner threaded bore of said pedestal mounting block, connected between a first side plate and a second side plate of said mounting bracket said pedestal further defining an upper end and a lower end, said lower end inserted within said inner threaded bore of said pedestal mounting block; and a V-shaped support channel having an outer surface forming a lower angled edge welded to said upper end of said pedestal, said support channel also having an inner surface defining a trough, said trough adapted to engage said motorcycle frame, wherein said pedestal is rotated within said inner threaded bore extending or lowering said pedestal, with said upper receiver aperture allowing for protrusion of said lower end of said pedestal into said cross support member.

* * * * *